United States Patent
Shimoda et al.

(10) Patent No.: US 6,340,738 B2
(45) Date of Patent: Jan. 22, 2002

(54) CONTINUOUS METHOD FOR MANUFACTURING POLYCARBONATE

(75) Inventors: Tomoaki Shimoda; Takeshi Sakashita, both of Ichihara (JP)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/845,642

(22) Filed: Apr. 30, 2001

Related U.S. Application Data

(63) Continuation of application No. 09/464,138, filed on Dec. 16, 1999.

(30) Foreign Application Priority Data

Dec. 28, 1998 (JP) ............................................. 10-374458

(51) Int. Cl.$^7$ ............................................. C08G 64/00
(52) U.S. Cl. ...................................... 528/196; 528/198
(58) Field of Search .................................. 528/196, 198

(56) References Cited

U.S. PATENT DOCUMENTS 6,124,422 A 9/2000 Mestanza

*Primary Examiner*—Terressa M. Boykin

(57) ABSTRACT

To provide a method with which a polycarbonate can be manufactured efficiently without any pipe clogging or foreign material admixture in the course of the continuous manufacture of a polycarbonate.

A continuous method for manufacturing a polycarbonate, characterized in that, in the continuous manufacture of a polycarbonate by transesterification from a dihydroxy compound and a carbonic diester, the crystallization of a polycarbonate lower polycondensate produced in the intermediate stage of a polycondensation reaction whose intrinsic viscosity (IV) measured at 20° C. in methylene chloride is between 0.1 and 0.4 dL/g is suppressed by setting the temperature to be at least 230° C. on the surface of the reactor equipment in contact with the polycarbonate lower polycondensate.

5 Claims, 1 Drawing Sheet

CONTINUOUS METHOD FOR MANUFACTURING POLYCARBONATE

This is a continuation of application Ser. No. 09/464,138 filed on Dec. 16, 1999, which is incorporated herein by reference.

BACKGROUND OF THE INVENTION

The present application is a U.S. non-provisional application based upon and claiming priority from Japanese Application No. HEI 10-374458, which is hereby incorporated by reference.

The present invention relates to a continuous polycarbonate manufacturing method in which a polycarbonate with few admixtures is manufactured continuously, stably, and efficiently.

Polycarbonates have excellent mechanical properties such as impact resistance, as well as excellent heat resistance, transparency and other properties. They are widely used in applications such as various types of mechanical components, optical disks, and automotive parts. They are particularly promising for optical applications such as miemory-use optical disks, optical fibers, and lenses.

Known methods for manufacturing these polycarbonates include a method in which a bisphenol such as bisphenol A is allowed to react directly with phosgene (interfacial method), and a method in which a bisphenol such as bisphenol A is subjected to a melt polyconciensation reaction (transesterification reaction) with a carbonic faiester s uch as diphenyl carbonate.

Of these two, the interfacial method using, phosgene is the more commonly implemented. On tLhe other hand, an advantage of the transesterification method is that a polycarbonate can be manulfactured more inexpensively than with the interfacial method, and because transesterification does not invole the use of a toxic substance such as phosgene, it is very promising as a polycarbonate manufacturing method.

Still, if the manufacture of a polycarbonate is carried out continuously over an extended period by this transesterification method, white foreign material can become admixed in the manufactured polycarbonate and can clog the piping lines, thereby lowering the manufacturing efficiency.

As a result of diligent research conducted in light of these problems, the inventors discovered that the lower polycarbonate polycondensate produced in the intermediate stage of a polycondensation reaction can crystallize when heated and become a source of white foreign material, and can crystallize on the pipe surfaces and become a cause of pipe clogging.

Upon further research, the inventors arrived at the present invention upon discovering that a lower polycarbonate polycondensate having an intrinsic viscosity between 0.1 and 0.4 dL/g readily undergoes crystallization at temperatures below 230° C., and therefore found that if the polycondensation of a polycarbonate is carried out by setting the temperature to be at least 230° C. on the surface of the reaction ecluipmnent in direct contact with a lower polycarbonate polycondensate having an intrinsic viscosity between 0.1 and 0.4 dL/g, then the admixture of white foreign material and the clogging of the piping due to polycarbonate crystallization will be suppressed, and a polycarbonate with excellent hue stability will be obtained efficiently.

BRIEF SUMMARY OF THE INVENTION

The present invention was conceived on the basis of the above-mentioned problems, and provides a method with wvlich a polycarbonate can be manufactured efficiently without any pipe clogging or foreign material admixture in the course of the continuous manufacture of a polycarbonate.

The continuous method for manufacturing a polycarbonate pertaining to the present invention is characterized in that, in the continuous manufacture of a polycarbonate by transesterification from a dihydroxy compound and a carbonic diester, the crystallization of a polycarbonate lower polycondensate produced in the intermediate stage of a polycondensation reaction whose intrinsic viscosity (IV) measured at 20° C. in metlhylene chloride is between 0.1 and 0.4 dL/g is suppressed by setting the temperature to be at least 230°C. on the surface of the reactor equipment in contact with the polycarbonate lower polycondensate.

DETAILED DESCRIPTION OF THE INVENTION

The continuous method for manufacturing a polycarbonate pertaining to the present invention will now be described in specific terms.

The continuous method for manufacturing a polycarbonate pertaining to the present invention is characterized in that the crystallization of a polycarbonate lower polycondensate produced in the intermediate stage of a polycondensation reaction whose intrinsic viscosity (IV) measured at 20° C. in methylene chloride is between 0.1 and 0.4 dL/g is suppressed by setting the temperature to be at least 230° C. on the surface of the reactor equipment in contact with the polycarbonate lower polycondensate.

First, the raw materials used in the manufacture of a polycarbonate by transesterification will be described.
Polycarbonate Polycondensation Raw Materials The raw materials used in the polycarbonate manufacturing method pertaining to the present invention are a bisphenol, a carbonic diester, and an alkaline compound catalyst. Preferred bisphenols have the following formula (I).
Bisphenol

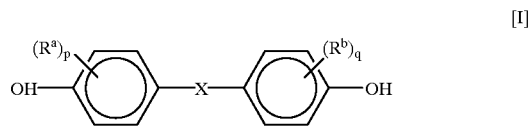

(In the formula, $R^a$ and $R^b$ are the same or different, and are each a halogen atom or a univalent hydrocarbon group. p and q are integers from 0 to 4. X is

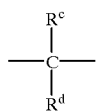

or

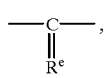

$R^c$ and $R^d$ are each a hydrogen atom or a univalent hydrocarbon group, $R^c$ and $R^d$ may form a ring structure, and $R^e$ is a divalent hydrocarbon group.)

Specific examples of the bisphenols expressed by the above formula (I) include:

bis(hydroxyaryl)alkanes such as:
1,1-bis(4-hydroxyphenyl)methane,
1,1-bis(4-hydroxyphenyl)ethane,
2,2-bis(4-hydroxyphenyl)propane (hereinafter referred to as bisphenol A),
2,2-bis(4-hydroxyphenyl)-butane,
2,2-bis(4-hydroxyphenyl)octane,
1,1-bis(4-hydroxyphenyl)propane,
1,1-bis(4-hydroxyphenyl)n-butane,
bis(4-hydroxyphenyl)phenylmethane,
2,2-bis(4-hydroxy-1-methylphenyl)propane,
1,1-bis(4-hydroxy-t-butylphenyl)propane, and
2,2-bis(4-hydroxy-3-bromophenyl)propane; and
bis-(hydroxyaryl)cycloalkanes such as:
1,1-bis (hydroxyphenyl)cyclopentane and
1,1-bis(4-hydroxyphenyl)cyclohexane.

Other bisphenols that can be used with the present invention are those in which X in the above formula is —O—, —S—, —SO—, or —SO$_2$—, examples of which include:
dihydroxyaryl ethers such as:
4,4'-dihydroxydiphenyl ether and
4,4'-dihydroxy-3,3'-dimethyiphenyl ether;
dihydroxydiaryl sulfides such as:
4,4'-dihydroxydiphenyl sulfide and
4,4'-dihydroxy-3,3'-dimethyldiphenyl sulfide;
dihydroxydiaryl sulfoxides such as:
4,4'-dihydroxydiphenyl sulfoxide and
4,4'-dihydroxy-33,'-dimethyldiplienyl sulfoxide; and
dihydroxydiarylsulfones such as:
4,4'-dihydroxydiphenylsulfone and
4,4'-dihydroxy-3,3'-dimethyldiphenylsulfone.

Other examples of bisphenols are the compounds expressed by the following formula (II).

[II]

(In the formula, $R^f$ is a halogen atom or a $C_1$ to $C_{10}$ hydrocarbon group or halogen-substituted hydrocarbon group, and n is an integer from 0 to 4. When n is equal to or greater than 2, the $R^f$ groups may be the same or different.)

Specific examples of the bisphenols expressed by this formula (II) include:
resorcin and substituted resorcins such as 3-methylresorcin, 3-ethylresorcin, 3-propylresorcin, 3-butylresorcin, 3-t-butylresorcin, 3-phenylresorcin, 3-cumylresorcin, 2,3,4,6-tetrafluororesorcin, and 2,3,4,6-tetrabromoresorcin;
catechol; and
hydroquinone and substituted hydroqluiniones such as 3-methylhydroquinone, 3-ethylhydroquinone, 3-propylhydroquinone, 3-butylhydroquinone, 3-t-butylhydro-quinone, 3-phenyihydroquinone, 3-cumylhydroquinone, 2,3,5,6-tetramethylhydroquinone, and 2,3,5,6-tetra-t-butylhydroquinone, 2,3,5,6-tetrafluorohydroquinone, and 2,3,5,6-tetrabromohydroquinone.

Furthermore, the 2,2,2',2'-tetralhydro-3,3,3',3'-tetramethyl-1,140-spirobi-[IH-indene]-6,6'-diol expressed by the following formula (III) can also be used as the bisphenol.

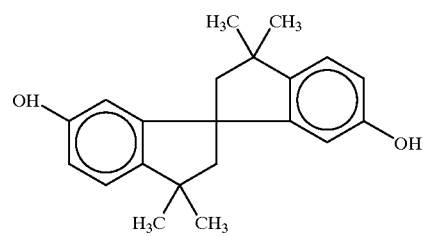

[III]

Of these compounds, a bisphenol expressed by the above-mentioned formula (I) is preferable, and bisphenol A is particularly favorable.

Carbonic Diester

Specific examples of carbonic diesters that can be used include diphenyl carbonate, ditolyl carbonate, bis(chloropIlenyl) carbonate, m-cresyl carbonate, dinaphthyl carbonate, bis(diphenyl) carbona te, liethyl carbonate, dimethyl carbonate, dibutyl carbonate and dicyclolhexyl carbonate. Two or more of these can also be used together. Of these, the use of diphenyl carbonate is particularly favorable.

These dliester carbonates may contain dlicarboxylic acids or dicarboxylic esters. In specific terms, the carbonic diester will preferably contain no more than 50 mol%, and most preferably no more than 30 mol%, dicarboxylic acids or dicarboxylic esters.

Examples of such dicarboxylic acids or dicarboxylic esters include terephthalic acid, isophthalic acid, diphenyl tereplthialate, diphenyl isophthalar , and oterer such aromatic dicarboxylic acids and esters; succinic acid, ,lutaric acid, adipic acid, pimelic acid, suberic acid, azclaic acid, sebacic acid, decanedioic acid, dodecanedioic acid, diphonyl sebacate, diphenyl decanedi-oate, d iphenyl dodecanedioate, and other such aliphatic dicarboxylic acids and esters; and cyclopropanedicaiboxylic acid, 1,2-cyclobutanedicarboxylic acid, 1,3-cyclobutane-d licarboxylic acid, 1,2-cyclopentanedicarboxylic acid, 1,3-cyclopentaneclicarboxylic acid, 1,2-cyclohexanedicarboxylic acid, 1,3-cyclohexanedicarboxylic acid, 1,4-cyclohcxane-dicarboxylic acid, diphenyl cyclopropaniccdicarboxylate, diphenyl 1,2-cyclobutane-dicarboxylate, diphenyl 1,3-cyclobutanedicarboxylate, diphenyl 1,2-cycloponatanedicarb-oxylate, diphenyl 1,3-cyclopentanedicarboxylate, diphenyl 1,2-cyclohexanedicarboxylate, diphonyl 1,3-cyclohexanedicarboxylate, diphenyl 1,4-cyclohexanedicarboxylatc , and other such alicyclic dicarboxylic acids and esters. The carbonic diester may also contain two or more types of these dicarboxylic acids or dicarboxylic esters.

The above-mentioned carbonic diester and bisphenol are usually mixed such that there will be 1.00 to 1.30 mol, and preferably 1.01 to 1.20 mol, of carbonic diester per mole of bisphenol.

Melt Polycondensation Catalyst

The transesterification reaction between the above-mentioned bisphenol and carbonic diester is usually carried out in the presence of a melt polycondensation catalyst.

The melt polycondensation catalyst is usually an alkali metal compound and/or an alkaline earth metal compound (a) (hereinafter referred to as alkali (alkaline earth) metal compound (a)).

Organic acid salts, inorganic acid salts, oxides, hydroxides, hydrides, alcoholates, and the like of alkali metals and alkaline earth metals can be used favorably as the alkali (alkaline earth) metal compound (a).

Specific examples of alkali metal compounds include sodium hydroxide, potassium hydroxide, lithium hydroxide, sodium hydrogencarbonate, potassium hydrogencarbonate, lithium hydrogencarbonate, sodium carbonate, potassium carbonate, lithium carbonate, sodium acetate, potassium acetate, lithium acetate, sodium stearate, potassium stearate, lithium stearate, sodium boron hydride, lithium boron hydride, sodium boron phenylate, sodium benzoate, potassium benzoate, lithium benzoate, disodlium hydrogen phosplhate, dipotassium hydrogenphosphate, dilithium hydrogenphosphate, the disodium, dipotassium, and dilithium salts of bisphenol A, and the sodium, potassium, and lithium salts of phenol.

Examples of alkaline earth metal compounds include calcium hydroxide, barium hydroxide, magnesium hydroxide, strontium hydroxide, calcium hydrogencarbonate, barium hydrogencarbonate, magnesium hydrogencarbonate, strontium hydrogencar-bonate, calcium carbonate, barium carbonate, magnesium carbonate, strontium carbonate, calcium acetate, barium acetate, magnesium acetate, strontium acetate, calcium stearate, barium stearate, magnesium stearate, and strontium stearate. Two or more types of these compounds can also be used togetlher.

The alkali (alkaline earth) metal compoundc is preferably included in the melt polycondensation reaction in an amount of $1 \times 10^{-8}$ to $1 \times 10^{-3}$ mol, and more preferably $1 \times 10^{-7}$ to $2 \times 10^{-6}$ mol, and particularly preferably $1 \times 10^{-7}$ to $8 \times 10^{-7}$ mol, per mole of the bisphenol. If an alkali (alkaline earth) metal compound is contained ahead of time in the bisphenol used as a raw material of the melt polycondensation reaction, it is preferable for the added amount to be controlled such that the amount of alkali (alkaline earth) metal compound present during the melt polycondensation reaction will be within the above-mentioned range per mole of the bisphenol.

A basic compound (b) may also be used together with the above-mentioned alkali (alkaline earth) metal compound (a) as the melt polycondensation catalyst.

Examples of this basic compound (b) include nitrogen-containing basic compounds that are volatile or readily decompose at high temperatures. The following compounds are specific examples:

Ammonium hydroxides having alkyl, aryl, aralkyl, or other such groups, such as tetramethylammonium hydroxide ($Me_4NOH$), tetraethylammonium hydroxide ($Et_4NOH$), tetrabutylammonium hydroxide ($Bu_4NOH$), and trimethylbenzylammonium hydroxide ($\phi$—$CH_2(Me)_3NOH$); tertiary amines such as trimethylamine, triethylamine, climethylbenzylamine, and triphenylamine; secondary amines expressed by the formula $R_2NH$ (where R is an alkyl such as methyl or ethyl, an aryl group such as phenyl or toluyl, or the like); primary amines expressed by the formula $RNH_2$ (where R is the same as above); pyridines such as 4-dirnethylaminopyridine, 4-ethylaminopyridine, and 4-pyrol-lidinopyridine; imidazoles such as 2-methylimidazole and 2-phenylimiciazole; and basic salts such as ammonia, tetramethylammonium borohydride ($Me_4NBH_4$), tetrabutylammonium borohyvcride ($Bu_4NBH_4$), tetrabutylammonium tetraphenyl borate ($Bu_4NBPh_4$), and tetramethylammonium tetraphenylborate ($Me_4NBPh_4$).

Of these, the use of a tetraalkylammonium hydroxide is preferable.

The above-mentioned nitrogen-containing basic compound (b) can be used in an amount of $1 \times 10^{-6}$ to $1 \times 10^{1}$ mol, and preferably $1 \times 10^{-5}$ to $1 \times 10^{-2}$ mol, per mole of bisphenol.

A boric acid compound (c) can also be used as the catalyst.

Examples of this boric acid compound (c) include boric acid and boric esters.

Examples of boric esters include the boric esters expressed by the following General Formula (IV).

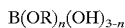

$$B(OR)_n(OH)_{3-n} \quad [IV]$$

In the formula, R is an alkyl such as methyl or ethyl, an aryl such as phenyl, or the like, and n is 1, 2, or 3.

Specific examples of boric esters such as these include trimethyl borate, triethyl borate, tributyl borate, trihexyl borate, trilheptyl borate, triphenyl borate, tritolyl borate, and trinaphthyl borate.

This boric acid or boric ester (c) can be used in an amiount of $1 \times 10^{-8}$ to $1 \times 10^{-1}$ mol, and preferably $1 \times 10^{-7}$ to $1 \times 10^{-2}$ mol, and even more preferably $1 \times 10^{-6}$ to $1 \times 10^{-4}$ mol, per mole of bisphenol.

It is preferable for the melt polycondensation catalyst to be, for example, a combination of the alkali (alkaline earth) metal compound (a) and the nitrogen-containinog basic compound (b), and even better for it to be the three components of the alkali (alkaline earth) metal compound (a), the nitrogen-containing basic compound (b), and the boric acid or boric ester (c).

It is preferable for a combination of an alkali (alkaline earth) metal compound (a) and a nitrogen-containing basic compound (b) to be used in the above amounts as the catalyst because the polycondlensation reaction can be made to proceed at a sufficient rate and a higlh molecular weight polycarbonate can be produced at a high polymerization activity.

When the alkali (alkaline earth) metal compound (a) and the nitrogen-containing basic compound (b) are used together, or when the alkali (alkaline earth) metal compound (a), the nitrogen-containing basic compound (b), and the boric acid compound (c) are used together, a mixture of the various catalyst components may be added to a molten mixture of a bisphenol and a carbonic diester, or they may be added individually to a molten mixture of a bisphenol and a carbonic diester.

The above-mentioned bisphenol and carbonic diester are subjected to melt polycondensation in the presence of the above-mentioned melt polycondensation catalyst. Micropar-ticles and other such impurities may be removed ahead of time from the liquid mixture of the bisphenol and the carbonic diester by using a fluororesin membrane filter.

The polycondensation reaction of the bisplhenol and the carbonic diester can be conducted under the same conditions as those known in the past for polycondensation reactions. For instance, it can be conducted in two or more reaction stages.

Specifically, in the first stage reaction the lbisphenol and the carbonic diester are allowed to react under normal pressure, at a temperature of 80 to 250° C., and preferably 100 to 230° C., anld even more preferably 120 to 190° C., for a time of 0.01 to 5 hours, and preferably 0.01 to 4 hours, and even more preferably 0.01 to 3 hours. The reaction temperature is then raised while the reaction system is reduced in pressure so as to brine, about a reaction between the bisphenol and the carbonic diester, and finally a polycondensation reaction between the bisphenol and the carbonic diester is conducted at 240 to 320° C. under reduced pressure of 5 mmHg, or less, andic preferably 1 mmHg or less.

In the manufacture of the polycarbonate, a polyfunctional compound having three or more functional groups per molecule may be used along with the above-mentioned bisphenol and carbonic diester. This polyfunctional compound is preferably a compound having phesndolic hydroxyl groups or carboxyl groups, with a compound having three phenolic hydroxyl groups being especially desirable. Examples include 1,1,1-tris(4-hydroxyphenyl)-ethane, 2,2', 2"-tris(4-hydroxyphenyl)diisopropylbenzene, α-methyl-α, α', α'-tris(4-hydroxyphenyl)-1,4-diethylbenzene, α,α',α"-tris (4-hydroxyphen-yl)-1,3,5-triisopropylbenzene, fluoroglycine, 4,6-dimethyl-2,4, 6-tri(4-hydroxyphenyl) hep-tane-2,1,3,5-tri(4-hydroxypheiiyl)benzene, 2,2-bis-[4, 4-(4,4'-dihydroxyphenyl)-cyclo-hexyl]propane, trimellitic acid, 1,3,5-benzenctricarboxylic acid, and pyromellitic acid.

Of these, the use of 1,1,1-tris(4-hydroxypheniyl)-ethane, α,α', α"-tris(4-hydroxy-phenyl)-1,3,5-triisopropylbenzene, or the like is preferable.

This polyfunctional compound is generally used in an amount of no more than 0.03 mol, preferably 0.001 to 0.02 mol, aind even more preferably 0.001 to 0.01 mol, per mole of the bisphenol.

A terminal capping agent may be used along, with the above-mentioned aromatic dihydroxy compound and the carbonic dilester in the manufacture of the polycarbonate.

An allyloxy compound capable of introducing a terminal group expressed by the following General Formula V at the molecular terminal of the obtained polycarboniate can be used as this terminal capping agent.

In the formula, Ar is an aromatic hydrocarbon group with 6 to 50 carbon atoms. There are no particular restrictions on the aromatic hydrocarbon group, which may be a phenyl group or naphthyl group, or an anthranyl group or other such condensed ring, and these aromatic rings may form rings with hetero atoms and/or saturated hydrocarbons. These aromatic rings may also be substituted with a halogen or an alkyl group with 1 to 9 carbon atoms.

Specific examples of this allyloxy compound include phenol, diphenyl carbonate, p-tert-butylphenol, p-tert-butylphenyl phenylcarbonate, p-tert-butyl phenylcarbonate, p-cumylphenol, p-cumylpphenyl phenylcarbonate, p-cumyl phenylcarbonate, 2,2,4-trimeth-yl-4-(4-hydroxyplhenyl) chroman, 2,2,4,6-tetramethyl-4-(3,5-dimethyl-4-hlydroxypheiyl)-chronan, 2,2,-trimethyl-3-(4-hydroxyp enyl)- chroman, 2,4,4-trimethyl-2-(2-hydroxy-phenyl) clhroman, 2,4,4,6-tetramethyl-2-(3,5-dimethyl-2-hydroxyphenyl)-chroman, and other such chroman compounds.

The above-mentioned allyloxy compounds can be used singly or in combinations. This allyloxy compound usually should be used in an amount of 0.01 to 0.2 mol, and preferably 0.02 to 0.15 mol, and even more preferably 0.02 to 0.1 mol, per mole of aromatic dihydroxy compound.

When an allyloxy compound is used in the above amount as a terminal capping agent, the molecular terminals of the polycarbonate thus obtained will be capped with end groups expressed by the above-mentioned General Formula V in a proportion of 1 to 95%, and preferably 10 to 95%, and even more preferably 20 to 90%.

A polycarbonate in which end groups expressed by General Formula V have thus been introduced in the above proportion will exhibit excellent heat resistance, as well as excellent mechanical properties, such as impact resistance, even aL a low molecular weight.

An aliphatic monocarboxy compound capable of introducing aliphatic hydrocarbon units expressed by the following General Formula VI may also be used as needed along with the above-mentioned allyloxy compound as a terminal capping agent.

[VI]

In the formula, R is an alkyl with 10 to 30 carbon atoms, and may be linear or branched, and may be halogen substituted.

Specific examples of this aliphatic monocarboxy compound include undecanoic acid, lauric acid, tridecanoic acid, pentadecanoic acid, palmitic acid, heptadecanoic acid, stearic acid, nonadecanoic acid, heneicosanoic acid, tricosanoic acid, melissic acid, and other such alkylmonocarboxylic acids, and methyl stearate, ethyl stearate, phenyl stearate, and other such methyl esters, ethyl esters, and phenyl esters of the above-mentioned alkylmonocarboxylic acids, and other such alkylmonocarboxylic esters.

These may be used singly or in combinations.

The above-mentioned aliphatic monocarboxy coim pound usually should be used in an amount of 0.01 to 0.20 mol, and preferably 0.02 to 0.15 mol, and even more preferably 0.02 to 0.10 mol, per mole of the aromatic dihydroxy compound.

The polymerization rate may decrease if the above-mntioned terminal capping agent is used in.a total amount of more than 0.2 mnol per mole of the aromatic dihydroxy compound.

Melt Polycondensation of the Polycarbonate

It is possible to use a known reaction apparatus in the continuous manufacture of a polycarbonate from the above-mentioned polymerization raw materials. It is particularly desirable to use reactors with different agitation configurations in the early stage of polymerization when the viscosity of the reaction product is low and in the later stage of polymerization when the viscosity is high.

Examples of these reactors include a vertically agitated polymerization tank, a thin film evaporation polymerization tank, a vacuum polymerization tank, a horizontally agitated polymerization tank, and a twin-screw vented extruder.

It is preferable to use two or more of these reactors combined in series, and a particularly favorable combination is for at least one of the reactors to be a horizontal reactor such as a horizontally agitated polymerization tank. Specific examples of such combinations include a vertically agitated polymerization tank and a horizontally agitated polymerization tank, a horizontally agitated polymerization tank and a vertically agitated polymerization tank, a horizontally agitated polymerization tank and a horizontally agitated polymerization tank, a vertically agitated polymerization tank and a vacuum polymerization tank and a horizontally agitated polymerization tank, and a thin film evaporation polymerization tank and two horizontally agitated polymerization tanks.

When a combination of two or more reactors is used, it is even better for three or more reactors to be used in series, in which case it is preferable for at least one of the reactors to be a horizontal reactor such as a horizontally agitated polymerization tank. Specific examples of Lisinig three or more reactors in series include two or more vertically agitated polymerization tanks and one horizontally agitated polymerization tank, one or more vertically agitated polymerization tanks and one thin film evaporation polymerization tank and one horizontally agitated polymerization tank, and one or more vertically agitated polymerization tanks and two or more horizontally agitated polymerization tanks.

The polycondensation reaction can be conducted more efficiently by thus using a combination of at least two reactors in series.

With the continuous method for manufacturing a polycarbonate pertaining to the present invention, the temperature is set to be at least 230° C., and preferably at least 240° C., on the surface of the reactor equipment in contact with the polycarbonate lower polycondensate produced in the intermediate stage of the polycondensation reaction of the above-mentioned bisphenol and carbonic diester, wherein this polycondeinisate has an intrinsic viscosity (IV) measured at 20° C. in methylene chloride of between 0.1 and 0.4 dL/g.

The inventors have learned that a lower polycarbonate polycondensate with an intrinsic viscosity between 0.1 and 0.4 dL/g has a tendency whereby it readily undergoes crystallization at a temperature of 230° C. or higher.

This tendency is illustrated in FIG. 1, for example. FIG. 1 shows the change in percentage crystallization as a function of temperature in polycarbonate polycondensates with an intrinsic viscosity of 0.06 dL/g, 0.18 dL/g, 0.36 dL/g, 0.46 dL/g, and 0.50 dL/g.

As is clear from FIG. 1, those polycaribonates whose intrinsic viscosity is 0.06 dL/g, 0.46 dL/g, and 0.50 dL/g all have a crystallization of 0% between 200 and 240° C., while those polycaribon,ates with an intrinsic viscosity of 0.18 dL/g and 0.36 6dL/g have a crystallization close to 0% at 230° C. and above, but have a higher crystallization at a temperature below 2230° C.

Thus, a polycarbonate whose percentage crystallization is between 0.1 and 0.4 dL/g readily crystallizes at a temperature under 230° C., and therefore if the surface temperature of the reactor equipment in direct contact with a polycarbonate having an intrinsic viscosity between 0.1 and 0.4 dL/g is set to 230° C. or higher, the crystallization of the polycarbonate will be suppressed, polycarbonate crystals will not be admixed as foreign material and the pipes will not become clogged, and a polycarbonate with excellent hue can be manufactured stably and continuously.

Examples of reactor equipment that comes into direct contact with a polycarbonate such as this include the polymerization tank, agitation impeller, piping, heat exchanger, and filter.

There are no particular restrictions on the method for setting the surface temperature of this reactor equipment to 230° C. or higher, but an example is to raise the temperature of the reaction tank itself. In the case of piping, a heater may be installed around the pipes. The polymerization tank, pipes, heat exchanger, and the like may also be covered with a thermal insulation material so that the surface temperature will not drop during the melt polycondensation.

The melt flow rate of the reaction product (polycarbonate) obtained by the manufacturing method pertaining to the present invention is 1 to 70 g/10 minutes, and preferably 2 to 50 g/10 minutes, measured at a temperature of 300° C. and a load of 1.2 kg with high viscosity products, and is 5 to 20 g/10 minutes, and preferably 8 to 16 g/10 minutes, meansured in the same manner but at a temperature of 250° C. and a load of 1.2 kgt witlh low viscosity products.

The following sulfur-containing acidic compound whose pKa is 3 or less and/or a derivative formed from this acidic compound (hereinafter sometimes referred to as "acidic compound") may be added immediately after the polycondensation reaction, without the polycarbonate (reaction product) thus obtained being cooled first.

Examples of sulfur-containing acidic compounds and derivatives formed from these acidic compounds include sulfurous acid, sulfuric acid, sulfinic acid-based compounds, sulfonic acid-based compounds, and derivatives of these. Specific examples of include sulfurous acid derivatives include dimethylsulfurous acid, diethylsulfurous acid, dipropylsulfurous acid, dibutylsulfurous acid, and diphenylsulfurous acid.

Examples of sulfuric acid derivatives include dimethylsulfuric acid, diethylsulfuric acid, dipropylsulfuric acid, dlibutylsulfuric acid, and diphenylsulfuric acid.

Examples of sulfinic acid-based compounds include benzenesulfinic acid, toluene-sulfinic acid, and naphthalene-sulfinic acid.

Examples of sulfonic acid-based compounds and derivatives thereof include compounds expressed by the following General Formula VII and ammonium salts thereof.

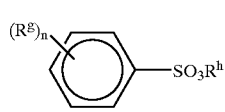

[VII]

In the formula, $R^g$ is a $C_1$ to $C_{50}$ hydrocarbon group or a halogen-substituted hydrocarbon group, $R^h$ is a hydrogen atom, a $C_1$ to $C_{50}$ hydrocarbon group, or a halogen-substituted hydrocarbon group, and n is an integer from 0 to 30.

Two or more types of these can be used in combiniation.

Of these acidic compounds, the use of sulfonic acid-based compounds expressed by the above-mentioned General Formula VII and derivatives thereof is preferable.

The polycarbonate (A) used in the present invention contains the above-mentioned acidic compound in an amount of 0.1 to 4.5 ppm, and preferably 0.2 to 3 ppm, with respect to the reaction product.

When an acidic compound is added in this amount to the reaction product (polycarbonate), any alkali metal compound catalyst remaining in the polycarbonate will be neutralized or weakened (in alkalinity), ultimately allowing a polycarbonate to be obtained with further enhanced retention stability and water resistance.

Water may be added along with the above-mentioned acidic compound. The water should be added in an amount of 5 to 1000 ppm, and preferably 10 to 500 ppm, and even more preferably 20 to 300 ppm, with respect to the reaction product (i.e., polycarbonate).

The kneading of the reaction product and the acidic compound is accomplished with an ordinary kneader such as a single-screw extruder, a twin-screw extruder, or a static mixer. In more specific terms, it is favorable for the acidic compound and water to be added while the reaction product obtained from the polycondensation reaction is in a molten state in the reactor or extruder.

Additives (E) may also be contained as needed. Specific examples or these additives (E) include thermal stabilizers, epoxy compounds, ultraviolet absorbents, parting agents, colorants, antistatic agents, slip agents, anti-blocking agents, lubricants, anti-fogging agents, natural oils, synthetic oils, waxes, organic fillers, and inorganic fillers.

As discussed above, with the method for manufacturing a polycarbonate pertaining to the present invention, the polycondensation of the polycarbonate is carried out with the surface temperature of the reactor equipment that comes into direct contact with the lower polycarbonate polycondensate having an intrinsic viscosity between 0.1 and 0.4 dL/g set to 230° C. or higher, so the admixture of white foreign material and the clogging of pipes due to polycarbonate crystallization are suppressed, and a polycarbonate with superior hue stability can be manufactured stably.

EFFECT OF THE INVENTION

With the present invention, the admixture of white foreign material and the clogging of pipes due to polycarbonate crystallization are suppressed, and a polycarbonate with superior hue stability can be manufactured stably. A polycarbonate obtained in this manner can be used favorably in sheeting and other construction materials, automotive headlamp lenses, eyeglasses and other such optical lenses, and optical disks and other such optical recording materials.

WORKING EXAMPLES

The present invention will now be described in specific terms through working examples, but the present invention is not limited to or by these examples.

WORKING EXAMPLES 1

POLYMERIZATION OF POLYCARBONATE

A polycarbonate was polymerized using one agitation tank for mixing the raw-x materials, two prepolymerizaiion tanks (prepolymerization tanks A and B), two horizontal polymerization tanks (horizontal polymerization tanks A and B), and pipes that connected the agitation tank with prepolymerization tank A, prepolymerization tank A with prepolymerization tank B, prepolymerization tank B with horizontal polymerization tank A, and horizontal polymerization tank A with horizontal polymerization tank B.

The various reaction conditions are shown in Table 1.

Molten bisphenol A pumped through a direct pipe from a bisphenol A manufacturing apparatus (supply rate: 36.0 kg/hr), molten diphenyl carbonate pumped through a direct pipe after distillation (supply rate: 34.7 kg/hr), a phenol solution containing tetra-methylammonium hydroxide in an amount of $2.5 \times 10^{-5}$ mol per mole of bisphenol A, and a phenol solution containing $1.0 \times 10^{-6}$ mol sodium hydroxide per mole of bisplhenol A were continuously supplied to the agitation tank to prepare a uniform solution.

Next, the uniform solution thus prepared was supplied at a rate of 36.0 kg/hr (calculated as bisphenol A) to prepolymerization tank A, prepolymerization tank B, horizontal polymerization tank A, and horizontal polymerization tank B, in that order, and a polycarboonate was polycondensed continuously for over a month under the above reaction conditions.

The results are given in Table 1.

TABLE 1

| Reactor equipment | Pressure (torr) | Surface temperature (° C.) | Average residence time (hr) |
|---|---|---|---|
| Polycondensation conditions | | | |
| Agitation tank | atmospheric pressure (nitrogen atmosphere) | 160 | 2 |
| Prepolymerization tank A | 100 | 230 | 1 |
| Prepolymerization tank B | 20 | 270 | 0.5 |
| Horizontal polymerization tank A | 2 | 305 | 0.5 |
| Horizontal polymerization tank B | 0.5 | 305 | 0.5 |
| Polycarbonate IV (dL/g) at prepolymerization tank A outlet | | 0.06 | |
| Polycarbonate IV (dL/g) at prepolymerization tank B outlet | | 0.18 | |
| Continuous operating conditions | nothing amiss for over 1 month | | |

The temperature of the pipe between prepolymerization tank B and horizontal polymerization tank A was set to at least 230° C.

During the manufacture of the polycarbotiate, it was confirmed that the total (amount) of alkali metal compound andl alkaline earth metal compound in the raw material bisphenol A and ciphenyl carbonate was no more than $1 \times 10^{-7}$ mol per mole of bisplhenol A.

WORKING EXAMPLE 2

A polycarbonate was manufactured in the same manner as in Working Example 1, except that the surface temperature of prepolymerization tank B was changed as shown in Table 2.

The results are given in Table 2.

As is clear from Tables 1 to 3, with Working Examples 1 and 2, even when the polycarbonate was manufactured continuously for over a month, no white foreign material was admixed in the manufactured polycarbonate and there was no pipe clogging.

Figure 1:
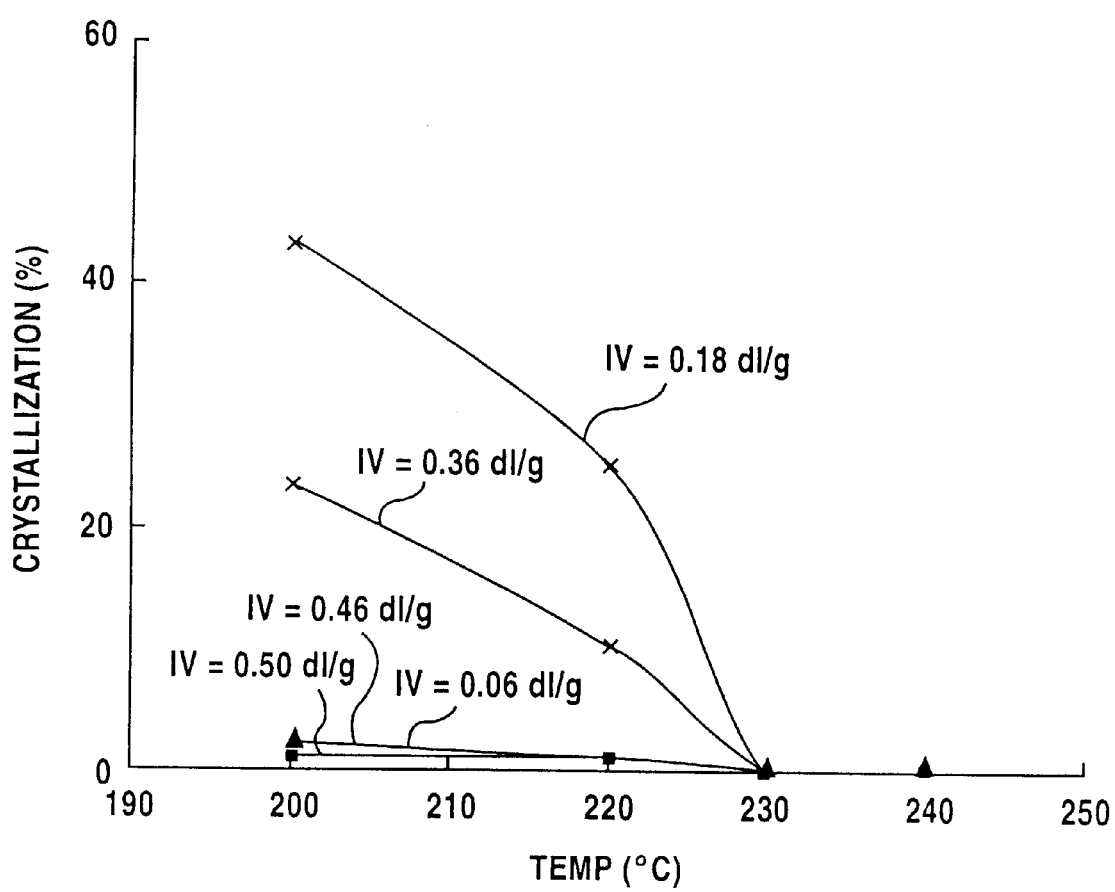
FIG. 1 is a graph of the temperature dependence of the polycarbonate crystallization.

What is claimed is:

1. A polycarbonate composition prepared by a continuous method, which method comprises the steps of:

transesterifying a dihydroxy compound and a carbonic diester to form the polycarbonate, wherein crystaliza-

TABLE 2

| Reactor equipment | Pressure (torr) | Surface temperature (° C.) | Average residence time (hr) |
|---|---|---|---|
| Polycondensation Agitation tank conditions | atmospheric pressure (nitrogen atmosphere) | 160 | 2 |
| Prepolymerization tank A | 100 | 230 | 1 |
| Prepolymerization tank B | 20 | 240 | 0.5 |
| Horizontal polymerization tank A | 2 | 305 | 0.5 |
| Horizontal polymerization tank B | 0.5 | 305 | 0.5 |
| Polycarbonate IV (dL/g) at prepolymerization tank A outlet | | 0.06 | |
| Polycarbonate IV (dL/g) at prepolymerization tank B outlet | | 0.17 | |
| Continuous operating conditions | nothing amiss for over 1 month | | |

The temperature of the pipe between prepolymerization tank B and horizontal polymerization tank A was set to at least 230° C.

COMPARATIVE EXAMPLE 1

A polycarbonate was manufactured in the same manner as in Working Example 1, except the surface temperatures of prepolymerization tank B and the pipe between prepolymerization tank B and horizontal polymerization tank A were changed as shown in Table 3.

The results are given in Table 3.

tion of a lower polycarbonate polycondensate in an intermediate stage of the reaction is supressed by setting the temperature on a surface of a reactor apparatus in contact with the lower polycarbonate polycondensate to be at least 230° C., wherein the lower polycarbonate condensate has an intrinsic viscosity (IV) measured at 20° C. in methylene chloride of between 0.1 and 0.4 dL/g.

TABLE 3

| Reactor equipment | Pressure (torr) | Surface temperature (° C.) | Average residence time (hr) |
|---|---|---|---|
| Polycondensation conditions | | | |
| Agitation tank | atmospheric pressure (nitrogen atmosphere) | 160 | 2 |
| Prepolymerization tank A | 100 | 210 | 1 |
| Prepolymerization tank B | 20 | 230 | 0.5 |
| Horizontal polymerization tank A | 2 | 305 | 0.5 |
| Horizontal polymerization tank B | 0.5 | 305 | 0.5 |
| Polycarbonate IV (dL/g) at prepolymerization tank A outlet | | 0.056 | |
| Polycarbonate IV (dL/g) at prepolymerization tank B outlet | | 0.16 | |
| Continuous operating conditions | White foreign material began to be admixed in horizontal polymerization tank A on the tenth day. At one month, the pipe between prepolymerization tank B and horizontal polymerization tank A was clogged. | | |

The temperature of the pipe between prepolymerization tank B and horizontal polyinerization tank A was set to at least 225° C.

2. The polycarbonate according to claim 1, wherein the dihydroxy compound is bisplhenol A, and the carbonic diester is diphenyl carbonate.

3. The polycarbonate according to claim 1, wherein the carbonic diester is selected from the group consisting of diplhenyl carbonate, ditolyl carbonate, bis(chlorodiphenyl) carbonate, m-cresyl carbonate, dinaphthyly carbonate, bis(diphenyl) carbonate, diethyl carbonate, dimethyl carbonate, dibutyl carbonate, and dicyclohexyl carbonate, and any mixture thereof.

4. The plycarbonate according to claim 1, wherein the dihydroxy compound is selected from the group consisting of 1,1-bis (4-hydroxyphenyl)methane; 1,1 -bis(4-hydroxy phenyl)ethane; 2,2-bis (4-hydroxyphenyl)propane; 2,2-bis (4-hydroxN phenyl) butane; 2,2-bis (4-hydroxyphenyl) octane; 1,1 -bis(4-hydroxy phenyl)propane; 1,1-bis (4-hydroxyphenyl)n-butane; bis(4-hydroxyphelnyl) plhenylmethane; 2,2-bis(4-hydroxy-1-methylphenyl) propane; 1,1-bis(4-hydroxy-t-butylphenyl)propane; 2,2-bis (4-hydlroxy-3-bromophenyl)propane; bis-(hydroxyaryl) cvcloalkanes, 1,1-bis(hydroxyphenyl)cyclopentane; 1,1-bis (4-hydroxyphenyl)cyclohexane; dihydroxyaryl ethers such as 4,4'-dihydroxydiphenyl ether; 4,4'-dihydroxy-3,3'-dichlorodiphenyl ether; dihydroxydiaryl sulfides; 4,4-dyhyydroxypliciyl sulfide; 4,4-dihydroxy-3,3'-dimethyldiphenyl sulfide; dihydroxydliaryl sulfoxides; 4,4'-dihydroxyphenyl sulfoxide; 4,4-dihydirox-3,3'-dimethyidiphenyl sulfoxide; dihydroxydiarylsulfones, 4,4'-dihydroxydiphenylsulfone; and 4,4'-dihydroxy-3,3-dimethyldiphenylsulfone, and any mixture thereof.

5. The composition according to claim 1, wherein the reactor apparatus is selected from the group consisting of a polNmierization tank, agitator impeller, piping, heat exchanger, and a filter, and anv combination thereof.

* * * * *